(12) United States Patent
Lee et al.

(10) Patent No.: US 9,106,923 B2
(45) Date of Patent: Aug. 11, 2015

(54) APPARATUS AND METHOD FOR COMPRESSING THREE DIMENSIONAL VIDEO

(75) Inventors: Jaejoon Lee, Seoul (KR); Du-Sik Park, Suwon-si (KR); Ho Cheon Wey, Seongnam-si (KR); Il Soon Lim, Hongseong-gun (KR); Seok Lee, Yongin-si (KR); Jin Young Lee, Ansan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 617 days.

(21) Appl. No.: 12/805,212

(22) Filed: Jul. 19, 2010

(65) Prior Publication Data

US 2011/0058017 A1  Mar. 10, 2011

(30) Foreign Application Priority Data

Sep. 10, 2009  (KR) .................. 10-2009-0085227

(51) Int. Cl.
*H04N 7/12* (2006.01)
*H04N 19/507* (2014.01)
*H04N 19/597* (2014.01)

(52) U.S. Cl.
CPC ........... *H04N 19/507* (2014.11); *H04N 19/597* (2014.11)

(58) Field of Classification Search
CPC .......... H04N 13/00; H04N 2013/0081; H04N 19/00769; H04N 19/00587; H04N 13/0271; H04N 5/2226; H04N 13/0018; H04N 19/507; H04N 19/597; G06T 7/0051; G06T 7/0075
USPC ........................................................... 348/43
IPC ...................................................... H04N 13/00
See application file for complete search history.

(56) References Cited

U.S. PATENT DOCUMENTS

| 5,617,334 | A | * | 4/1997 | Tseng et al. | .......... 348/E13.014 |
| 2004/0075654 | A1 | * | 4/2004 | Hsiao et al. | ................... 345/418 |
| 2008/0205791 | A1 | * | 8/2008 | Ideses et al. | ................... 382/285 |
| 2009/0015662 | A1 | * | 1/2009 | Kim et al. | ...................... 348/43 |
| 2009/0080767 | A1 | | 3/2009 | Boughorbel | |

FOREIGN PATENT DOCUMENTS

| JP | 2008-505522 | 2/2008 |
| KR | 1020070026403 | 3/2007 |

(Continued)

OTHER PUBLICATIONS

Zhu et al., View Synthesis Oriented Depth Map Coding Algorithm, 2009. APCIP 2009. Asia-Pacific Conference on Information Processing (vol. 2), Jul. 8-19, 2009, p. 104-107.*

(Continued)

*Primary Examiner* — Jay Patel
*Assistant Examiner* — Francis G Geroleo
(74) *Attorney, Agent, or Firm* — NSIP Law (57) ABSTRACT

A three-dimensional (3D) compressing method and apparatus is disclosed. The 3D video compressing apparatus determines whether a motion of consecutive frames exists when a depth of a multi-view video is estimated, performs a depth estimation when the motion exists, and compresses the 3D video by using a color video motion vector as a depth video motion vector.

12 Claims, 6 Drawing Sheets

(56) References Cited

FOREIGN PATENT DOCUMENTS

| KR | 1020080052309 | | 6/2008 |
| WO | WO 2009091383 | A2 * | 7/2009 |

OTHER PUBLICATIONS

Ideses et. al., Real-time 2D to 3D video conversion, Aug. 28, 2007, Springer-Verlag 2007, Real-Time Image Processing, pp. 3-9.*

* cited by examiner

APPARATUS AND METHOD FOR COMPRESSING THREE DIMENSIONAL VIDEO

CROSS-REFERENCE TO RELATED APPLICATIONS

This application claims the benefit of Korean Patent Application No. 10-2009-0085227, filed on Sep. 10, 2009, in the Korean Intellectual Property Office, the disclosure of which is incorporated herein by reference.

BACKGROUND

1. Field

Example embodiments of the present disclosure relate to a 3D video compressing method and apparatus, and more particularly, to a technology that decreases an amount of calculation used to compress a 3D video and a number of bits generated after the compression.

2. Description of the Related Art

A stereoscopic video is a three dimensional (3D) video that simultaneously provides configuration information about a depth and a space. In this instance, videos taken from different viewpoints are needed to provide different videos that appear as if seen from different directions depending on a viewpoint of an observer. In contrast, stereo vision videos merely provide an video having a different viewpoint for each of a left eye and a right eye. However, it is difficult to sufficiently procure a network infrastructure, terrestrial bandwidth, and the like, when videos taken from various viewpoints are compressed for transmission, since the videos taken from various viewpoints require a large amount of data.

Accordingly, the amount of data being generated during the compression may decrease when a depth video that is generated is compressed together with videos of a portion of viewpoints among the videos of various viewpoints, instead of compressing all the video of various viewpoints and transmitting the compressed video. Thus, when transmitting the compressed depth video with the videos of a portion of the viewpoints, the amount of data transmitted is less than the amount of data transmitted when transmitting all the compressed videos. The depth video is generally estimated by a method of estimating a depth video from a predetermined multi-view video, instead of a method that uses many depth cameras.

Here, the depth estimation is a process that uses a large number of calculations similar to motion estimation, and expends a long time in a multi-view video compression process.

Accordingly, there is a desire for a method and an apparatus capable of effectively compressing a 3D video by effectively performing depth estimation when the 3D video is compressed for transmission.

SUMMARY

According to example embodiments of the present disclosure, a three-dimensional (3D) video compressing apparatus may be provided. The 3D video compressing apparatus may include a motion estimating unit to estimate a motion of an inputted multi-view video to generate a color video motion vector, a depth estimating unit to generate a depth video of the inputted multi-view video by using the color video motion vector, and an encoding unit to compress the inputted multi-view video, the depth video, and the color video motion vector, to generate a compression video.

In this instance, the 3D video compressing apparatus further includes a motion determining unit to determine, by using the color video motion vector, whether an video motion exists between two consecutive frames of the inputted multi-view video, and an video copying unit to copy a depth video estimated from a previous frame of the consecutive frames and to use the copied depth video as a depth video of a current frame of the consecutive frames, when the video motion does not exist between the two consecutive frames.

Also, the motion determining unit includes determining whether an video motion exists for each block of the two consecutive frames, and determining that a block does not have a motion, when the color video motion vector corresponding to the block is (0,0).

Also, the video copying unit copies a depth video block estimated from the previous frame and uses the copied depth video block as the depth video of the current frame of the two consecutive frames, when the color video motion vector corresponding to the block is (0,0).

Also, the 3D video compressing apparatus further comprises a decoding unit to restore the compression video, and a view synthesis unit to generate, by using the restored video, an output video having a number of viewpoints greater than the inputted multi-view video.

Also, the decoding unit restores the compression video as the inputted multi-view video, the depth video, and the color video motion vector, and the view synthesis unit uses the color video motion vector as a depth video motion vector.

According to example embodiments, there may be provided a three-dimensional (3D) video compressing method, including generating a color video motion vector by estimating a motion of an inputted multi-view video, generating a depth video of the inputted multi-view video by using the color video motion vector, and generating a compression video by compressing the inputted multi-view video, the depth video, and the color video motion vector.

Also, the 3D video compressing method further includes determining, by using the color video motion vector, whether an video motion exists between two consecutive frames of the inputted multi-view video, and copying a depth video estimated from a previous frame of the two consecutive frames and using the copied depth video as a depth video of a current frame of the two consecutive frames, when an video motion does not exist between the two frames.

Also, the determining includes determining whether an video motion exists for each block of the two consecutive frames and determining that a block does not have a motion, when a color video motion vector corresponding to the block is (0,0).

Also, the generating of the depth video includes estimating a depth with respect to the block, when the color video motion vector of the block is different from (0,0).

Also, 3D video compressing method includes restoring the compression video, and generating, by using the restored video, an output video having a number of viewpoints greater than the inputted multi-view video.

Also, the restoring restores the compression video as the inputted multi-view video, the depth video, and the color video motion vector, and the generating of the output video generates the video by using the color video motion vector as a depth video motion vector.

Additional aspects and/or advantages will be set forth in part in the description which follows and, in part, will be apparent from the description, or may be learned by practice of the embodiments.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Reference will now be made in detail to example embodiments, examples of which are illustrated in the accompanying drawings, wherein like reference numerals refer to the like elements throughout. Example embodiments are described below to explain the present disclosure by referring to the figures.

Figure 1:
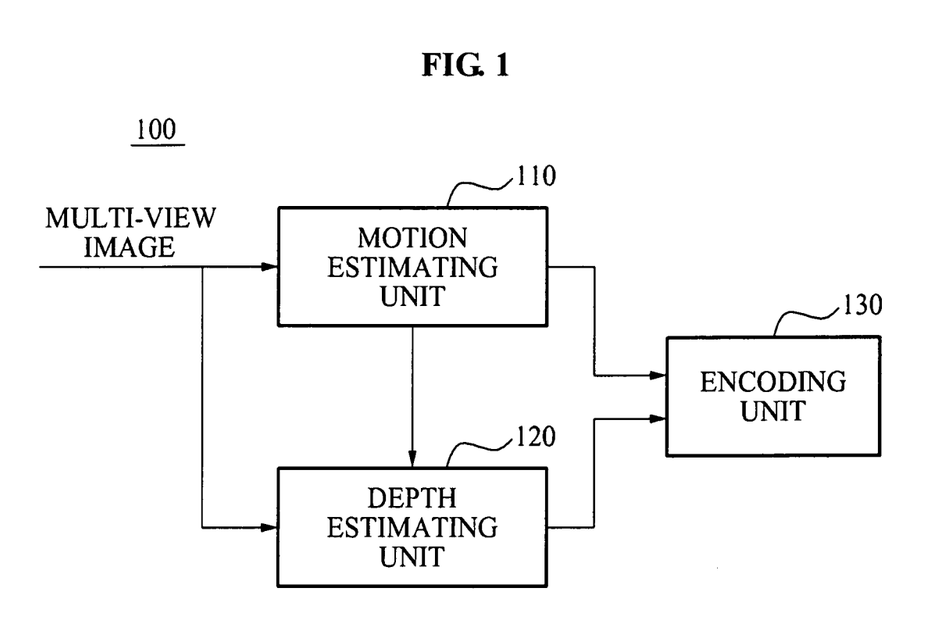
FIG. 1 is a diagram illustrating a three-dimensional (3D) video compressing apparatus according to example embodiments.

FIG. 1 is a diagram illustrating a three-dimensional (3D) video compressing apparatus 100 according to example embodiments.

Referring to FIG. 1, the 3D video compressing apparatus 100 may include, for example, a motion estimating unit 110, a depth estimating unit 120, and an encoding unit 130.

The motion estimating unit 110 may generate a color video motion vector by estimating an inputted multi-view video. As an example, motion estimation is performed based on a macro block unit, and searches for a block that minimizes a luminance difference between a macroblock to be currently compressed and adjacent macroblocks of a plurality of previous and subsequent frames to determine the color video motion vector.

The depth estimating unit 120 may generate a depth video of the inputted multi-view video by using the color video motion vector. That is, the color video motion vector generated from the motion estimating unit may be used for depth estimation. As an example, the depth estimation that is typically performed by block matching on every frame is not performed. Instead, a motion of an video is detected by using the color video motion vector, a depth with respect to a location where the motion exists is estimated, and a depth video of a previous frame may be used for a location where the motion does not exist.

The encoding unit 130 may compress the inputted multi-view video, the depth video, and the color video motion vector, and may generate a compression video. That is, a depth video motion vector is not separately generated from the depth video and the color video motion vector generated from the inputted multi-view video is shared and is used as the depth video motion vector.

As described above, the depth estimation is performed by using the color video motion vector, and an video is compressed by using the color video motion vector as the depth video motion vector, and thus, an amount of compression data decreases.

Figure 2:
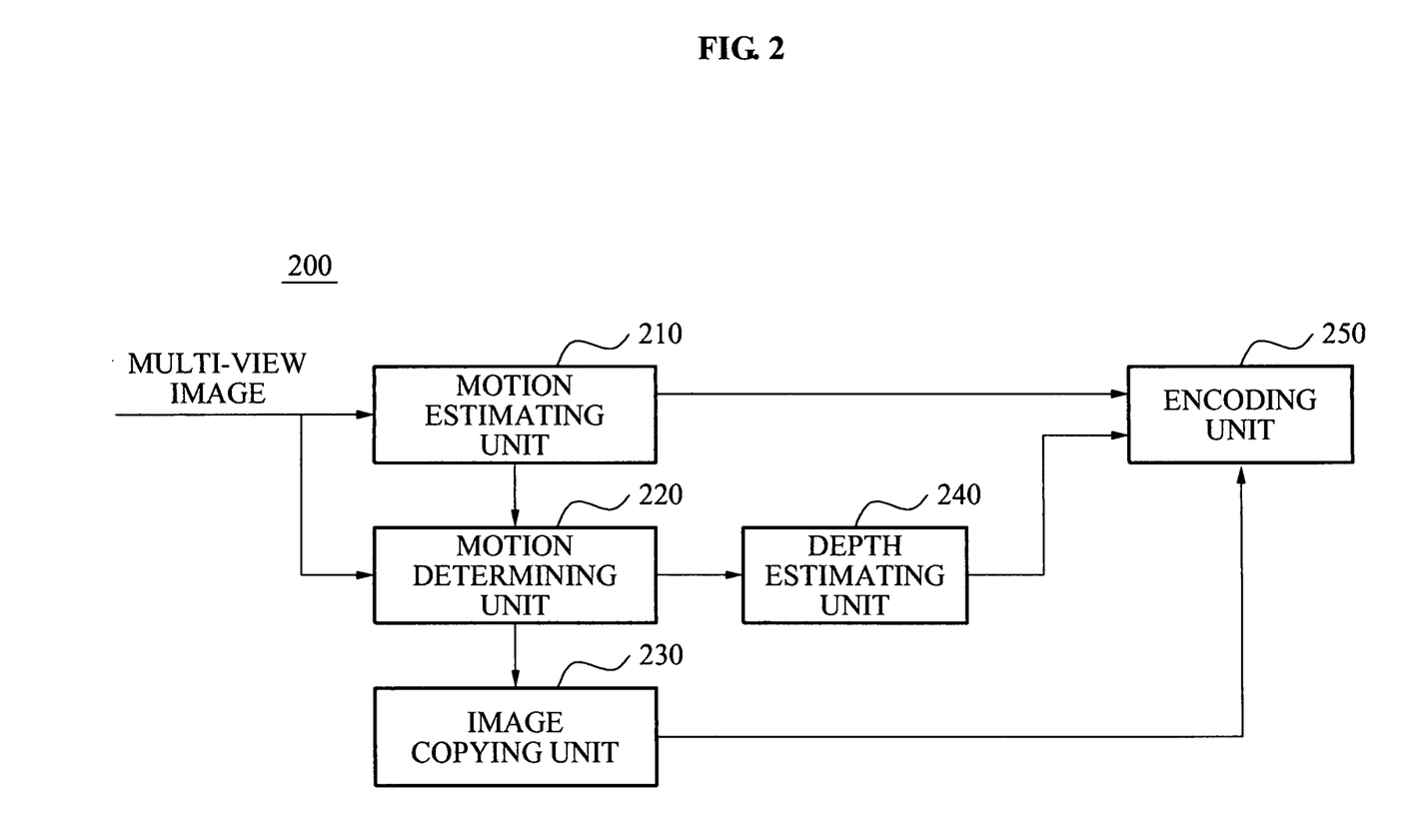
FIG. 2 is a diagram illustrating a 3D video compressing apparatus according to other example embodiments.

FIG. 2 is a diagram illustrating a 3D video compressing apparatus 200 according to other example embodiments.

Referring to FIG. 2, the 3D video compressing apparatus 200 may include, for example, a motion estimating unit 210, a motion determining unit 220, an video copying unit 230, a depth estimating unit 240, and an encoding unit 250.

The motion estimating unit 210 may generate a color video motion vector by estimating a motion of an inputted multi-view video, in the same manner as in the description of FIG. 1. In this instance, the color video motion vector may be performed for each block in a frame.

The motion determining unit 220 may determine whether an video motion exists between two consecutive frames of the inputted multi-view video, by using the color video motion vector. As an example, when a color video motion vector of a predetermined block is (0,0), it is determined that the predetermined block does not have a motion.

The video copying unit 230 may copy a depth video estimated from a previous frame of the consecutive frames, and may use the copied depth video as a depth video of a current frame of the consecutive frames, when no video motion exists between the two consecutive frames. As an example, when a block matching is performed by dividing a single frame into 16×16 blocks, a motion is estimated with respect to all the 16×16 blocks, and a block of which color video motion vector is (0,0) is determined as a block that does not have a motion, and thus, a depth video block estimated from the previous frame is used as a depth video block of the current frame.

The depth estimating unit 240 may estimate a depth of each frame video. In this instance, depth estimation is not separately performed when no motion exists compared with the previous frame, and the depth estimation is performed when the motion determining unit 220 determines that motion does exist with respect to the previous frame. As an example, in a case of block matching of the frame being divided into 16×16 blocks, motion estimation is performed with respect to all the 16×16 blocks, and a block of which a motion vector is not (0, 0) is determined to have a motion, and thus, depth estimation is performed.

The encoding unit 250 may generate a compression video by compressing the multi-view video, the color video motion vector, the depth video estimated from the depth estimating unit 240, and the depth video copied from the video copying unit 230.

That is, the depth estimation is not performed for every frame or every block of a frame. However, the depth estimation is only performed with respect to a frame where a motion exists and with respect to a block where a motion exists. Also, the previous frame is copied and is used as a depth video with respect to a frame where a motion does not exist and with respect to a block where a motion does not exist, and thus, an amount of calculation needed during a compression process may be decreased.

Also, a depth video motion vector is not separately generated, and compression is performed by using the color video motion vector as the depth video motion vector, and thus, an amount of compression data may be decreased.

Also, when the depth video is generated, a depth video of the previous frame is used with respect to a portion where a motion does not exist, and thus, a flash caused by differences in brightness of various viewpoint videos used for estimating a depth may decrease.

Figure 3:
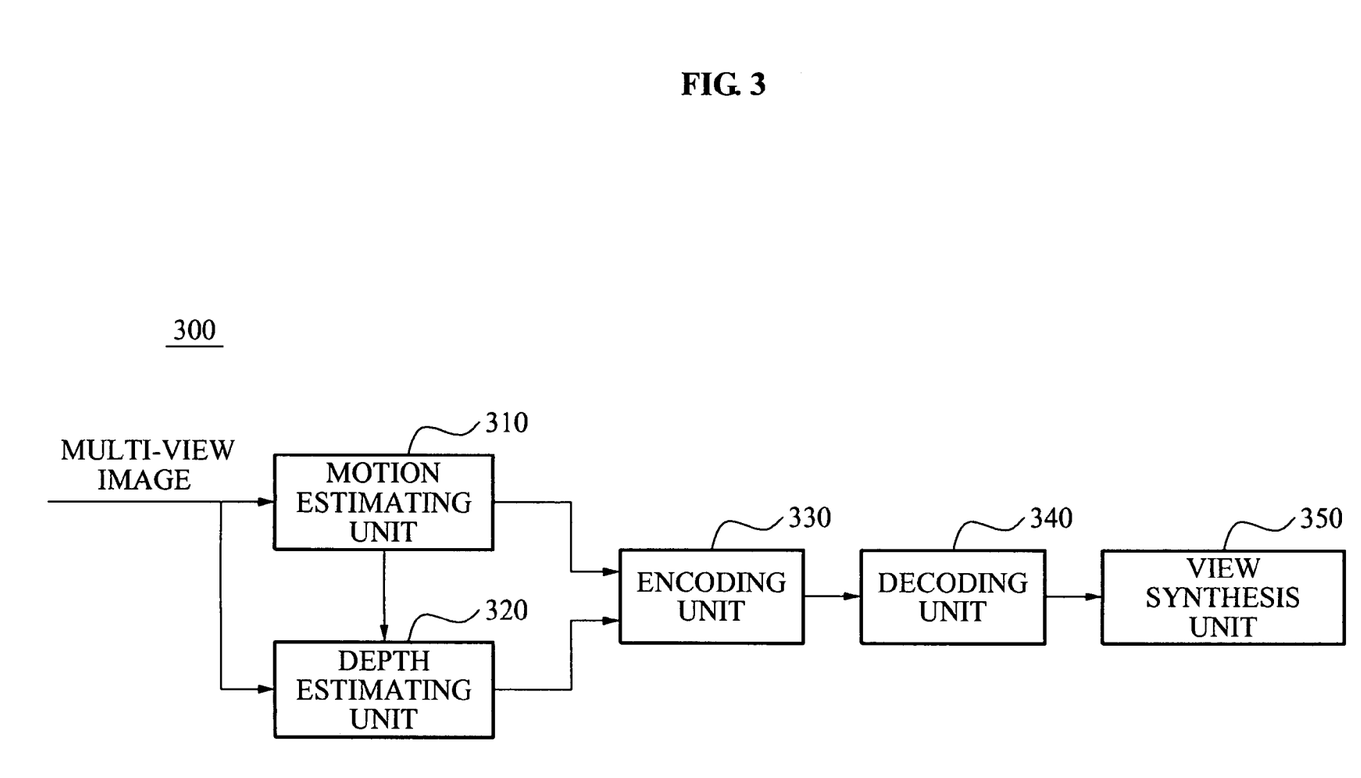
FIG. 3 is a diagram illustrating a 3D video compressing apparatus according to still other example embodiments.

FIG. 3 is a diagram illustrating a 3D video compressing apparatus 300 according to still other example embodiments.

Referring to FIG. 3, the 3D video compressing apparatus 300 may include, for example, a motion estimating unit 310, a depth estimating unit 320, an encoding unit 330, a decoding unit 340, and a view synthesis unit 350.

In the same manner as the description of FIG. 1, the motion estimating unit 310 may generate a color video motion vector by estimating a motion of an inputted multi-view video, the depth estimating unit 320 may generate a depth video of the inputted multi-view video by using the color video motion vector, and the encoding unit 330 may compress the inputted multi-view video, the depth video, and the color video motion vector to generate a compression video.

The decoding unit 340 may restore the compression video. As an example, the decoding unit 340 may restore the compression video as the inputted multi-view video, the depth video, and the color video motion vector.

The view synthesis unit 350 may generate an output video having a number of viewpoints greater than the inputted multi-view video. Here, when the output video is generated by using the restored video, the color video motion vector may be used as a depth video motion vector.

As described in the above description, the output video is generated by using the color motion vector as the depth video motion vector, and thus, an output video having little noise may be generated from a small size of compression data.

Figure 4:
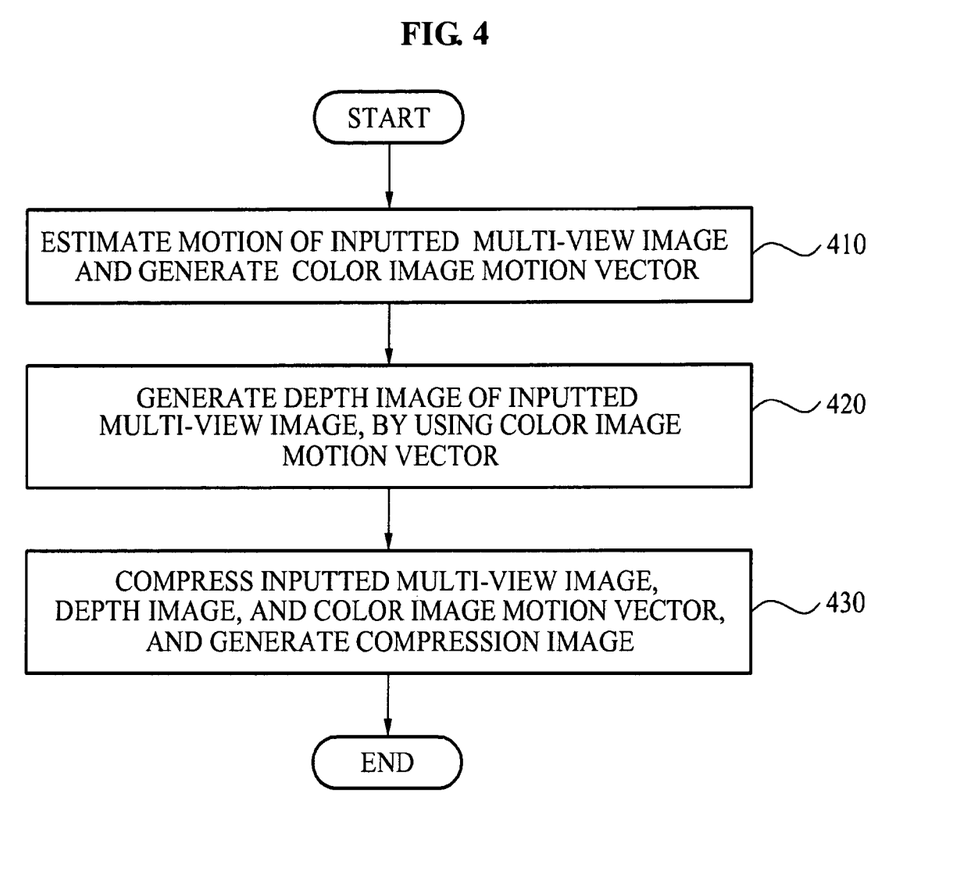
FIG. 4 is a flowchart illustrating a 3D video compressing method according to example embodiments.

FIG. 4 is a flowchart illustrating a 3D video compressing method according to example embodiments Referring to FIG. 4, a color video motion vector is generated by estimating a motion of an inputted multi-view video in operation 410.

In operation 420, a depth video of the inputted multi-view video may be generated by using the color video motion vector. That is, the depth estimation may be performed by using the color video motion vector when a depth is estimated.

In operation 430, a compression video may be generated by compressing the inputted multi-view video, the depth video, and the color video motion vector. Accordingly, a separate depth video motion vector is not compressed together, and the color video motion vector may be used as the depth video motion vector.

Figure 5:
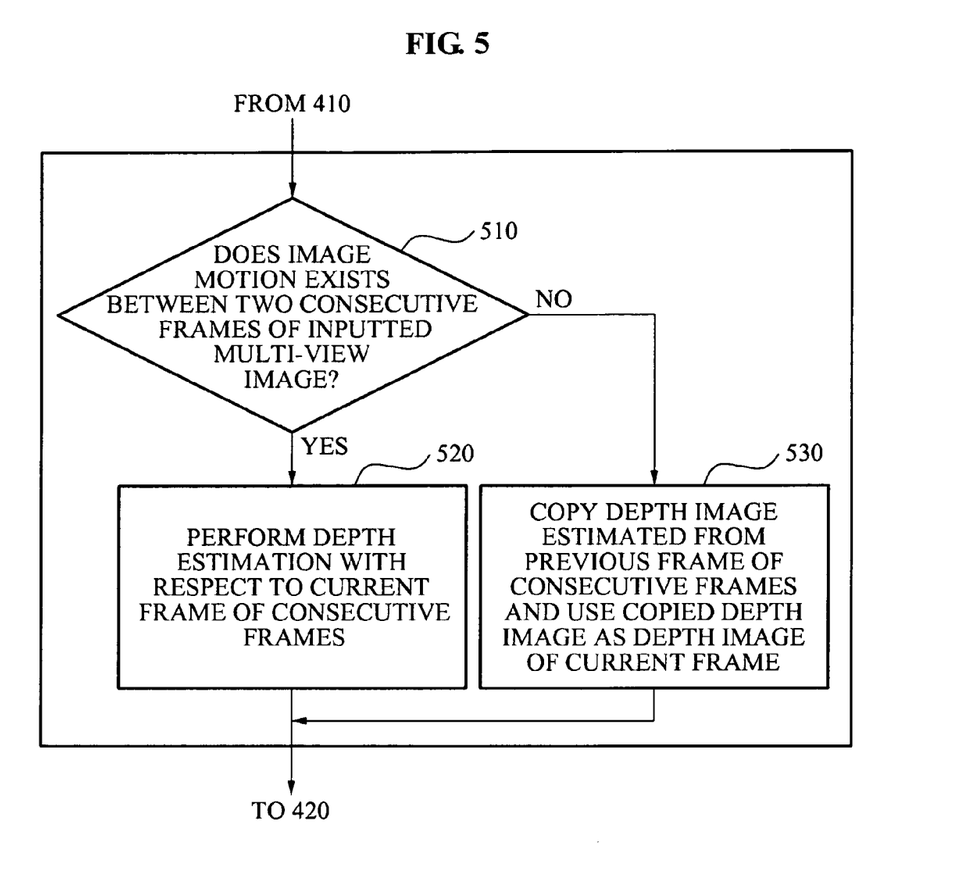
FIG. 5 is a flowchart illustrating a process of estimating a depth based on whether an video motion exists, according to other example embodiments.

FIG. 5 is a flowchart illustrating a process of estimating a depth based on whether an video motion exists, according to other example embodiments.

Referring to FIG. 5, in operation 510, whether an video motion exists between two consecutive frames of an inputted multi-view video is determined by using a color video motion vector. In this instance, a frame may be divided into blocks of various sizes, such as 8×8, 16×16, and the like, and the determination of whether the video motion exists may be performed for each block of the frame.

In operation 520, a depth may be estimated with respect to a current frame of the two consecutive frames may be performed, when the video motion exists between the two consecutive frames.

In operation 530, a depth video estimated from a previous frame of the two consecutive frames is copied and is used as a depth video of the current frame of the two consecutive frames.

Figure 6:
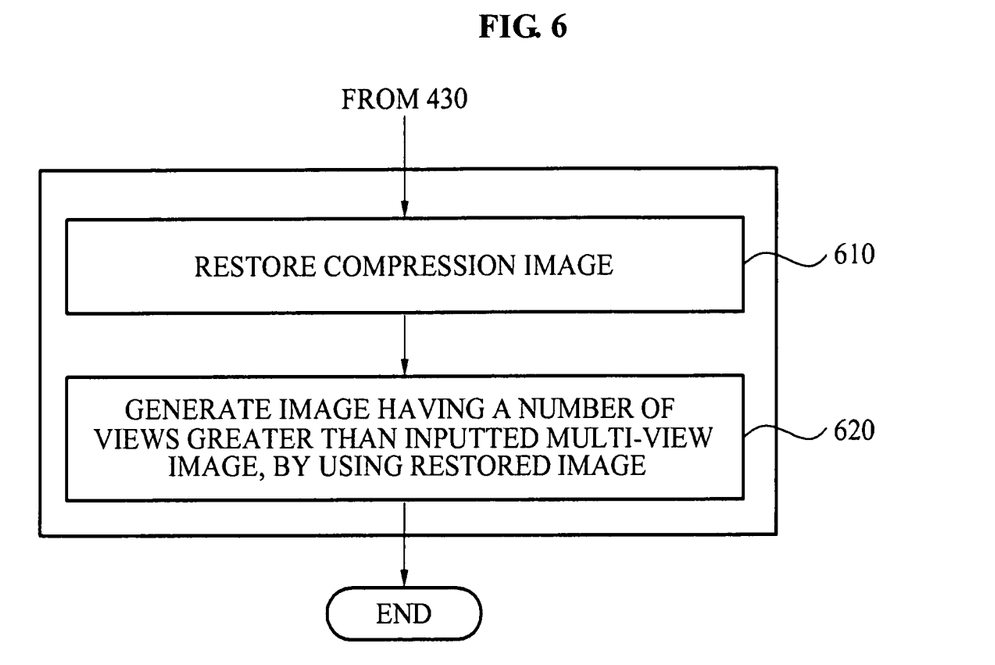
FIG. 6 is a flowchart illustrating a process of decoding and generating an output multi-view video according to other example embodiments.

FIG. 6 is a flowchart illustrating a process of decoding and generating an output multi-view video according to example embodiments.

Referring to FIG. 6, a compression video may be restored in operation 610.

In operation 620, an output video having a number of viewpoints greater than the inputted multi-view video is generated using the restored video.

Also, a 3D video compressing method may be performed by a component constituting a 3D video compressing apparatus, and a portion omitted in description of FIGS. 4 through 6 may be understood with reference to the description of FIGS. 1 through 3.

As described above, according to example embodiments, a depth video motion vector is not calculated separately, but instead, a color video motion vector is shared, and thus, a number of calculations may be decreased when a multi-view video is compressed.

Also, when a depth is estimated, the depth estimation is performed with respect to a portion where a motion occurs, and a previous frame is used with respect to a portion where a motion does not occur, and thus, an amount of calculation needed for compression is dramatically decreased.

The 3D video compressing method according to exemplary embodiments of the present disclosure include computer-readable media including program instructions to implement various operations embodied by a computer. The media may also include, alone or in combination with the program instructions, data files, data structures, tables, and the like. The media and program instructions may be those specially designed and constructed for the purposes of the present disclosure, or they may be of the kind well known and available to those having skill in the computer software arts. Examples of computer-readable media include magnetic media such as hard disks, floppy disks, and magnetic tape; optical media such as CD ROM disks; magneto-optical media such as optical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter. The described hardware devices may be configured to act as one or more software modules in order to perform the operations of the above-described embodiments of the present disclosure, or vice versa. The instructions may be executed on any processor, general purpose computer, or special purpose computer such as a 3D video compressing system or apparatus. Further, the software modules may be controlled by any processor.

Although a few example embodiments have been shown and described, it would be appreciated by those skilled in the art that changes may be made in these example embodiments without departing from the principles and spirit of the disclosure, the scope of which is defined in the claims and their equivalents.

What is claimed is:

1. An apparatus of compressing a three-dimensional (3D) video, the apparatus comprising:
    a motion estimating unit configured to generate a color video motion vector by estimating a motion of an inputted multi-view video, and by detecting a block that minimizes a luminance difference between a block of a current frame to be compressed and adjacent blocks of a previous frame;
    a motion determining unit configured to determine, by using the color video motion vector, whether an video motion of the block of the current frame exists between the two consecutive frames;
    a video copying unit configured to copy a depth value of a block of the previous depth frame of a depth video corresponding to the block of the previous frame, and to use the copied depth value as a depth value of a block of a current depth frame of the depth video corresponding to the block of the current frame when no video motion of the block the current frame exists between the two consecutive frames;
    a depth estimating unit configured to generate the depth value of the block of the current depth frame based on the color video motion vector when the video motion of the block of the current frame exists, wherein a depth video motion vector is not generated from the depth video and the color video motion vector used as the depth video motion vector for the current depth frame; and an encoding unit, controlled by a processor, to compress the inputted multi-view video, the depth video, and the color video motion vector, to generate a compression video.

2. The apparatus of claim 1, wherein the motion determining unit further determines that the block of the current frame does not have a motion, when the color video motion vector corresponding to the block of the current frame is (0,0).

3. The apparatus of claim 1, wherein the depth estimating unit estimates the depth value of the block of the current frame, when the color video motion vector corresponding to the block of the current frame is different from (0,0).

4. The apparatus of claim 1, further comprising:
a decoding unit configured to restore the compression video; and
a view synthesis unit configured to generate, by using the restored video, an output video having a number of viewpoints greater than the inputted multi-view video.

5. The apparatus of claim 4, wherein:
the decoding unit restores the compression video as the inputted multi-view video, the depth video, and the color video motion vector; and
wherein the view synthesis unit uses the color video motion vector as the depth video motion vector.

6. A method of compressing a 3D video, comprising:
generating a color video motion vector by estimating a motion of an inputted multi-view video and by detecting a block that minimizes a luminance difference between a block of current frame to be compressed and adjacent blocks of a previous frame;
determining, by using the color video motion vector, whether an video motion of the block of the current frame exists between the two consecutive frames;
copying a depth value of a block of the previous depth frame of a depth video corresponding to the block of the previous frame, and to use the copied depth value as a depth value of a block of a current depth frame of the depth video corresponding to the block of the current frame when no video motion of the block the current frame exists between the two consecutive frames;
generating the depth value of the block of the current depth frame based on the color video motion vector when the video motion of the block of the current frame exists, wherein a depth video motion vector is not generated from the depth video and the color video motion vector used as the depth video motion vector for the current depth frame; and
generating a compression video, using a processor, by compressing the inputted multi-view video, the depth video, and the color video motion vector.

7. The method of claim 6, wherein the determining comprises:
determining that the block of the current frame does not have a motion, when a color video motion vector corresponding to the block of the current frame is (0,0).

8. The method of claim 6, wherein the generating of the depth video comprises:
estimating the depth value of the block of the current frame, when the color video motion vector corresponding to the block of the current frame is different from (0,0).

9. The method of claim 6, further comprising:
restoring the compression video; and
generating, by using the restored video, an output video having a number of viewpoints greater than the inputted multi-view video.

10. The method of claim 9, wherein:
the restoring restores the compression video as the inputted multi-view video, the depth video, and the color video motion vector.

11. A non-transitory computer readable recoding medium storing a program implementing the method of claim 6.

12. An apparatus of compressing a three-dimensional (3D) video, the apparatus comprising:
a motion estimating unit configured to generate a color video motion vector by estimating a motion of an inputted multi-view video and by detecting a block that minimizes a luminance difference between a block of current frame to be compressed and adjacent blocks of a previous frame;
a motion determining unit configured to determine, by using the color video motion vector, whether an video motion of the block of the current frame exists between the two consecutive frames;
an video copying unit configured to copy a depth value of a block of the previous depth frame of a depth video corresponding to the block of the previous frame, and to use the copied depth value as a depth value of a block of a current depth frame of the depth video corresponding to the block of the current frame when no video motion of the block the current frame exists between the two consecutive frames; and
a depth estimating unit configured to generate the depth value of the block of the current depth frame based on the color video motion vector when the video motion of the block of the current frame exists, wherein when the motion estimating unit estimates that motion exists in a current frame, a depth video motion vector is not generated from the depth video and the color video motion vector used as the depth video motion vector for the current depth frame.

* * * * *